US010239628B2

(12) United States Patent
Pierce

(10) Patent No.: US 10,239,628 B2
(45) Date of Patent: Mar. 26, 2019

(54) SET OF LATCHES WITH IDENTICAL COMPONENTS FOR NACELLE DOORS

(71) Applicant: Rohr, Inc., Chula Vista, CA (US)

(72) Inventor: David Pierce, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 189 days.

(21) Appl. No.: 15/266,007

(22) Filed: Sep. 15, 2016

(65) Prior Publication Data

US 2018/0072429 A1    Mar. 15, 2018

(51) Int. Cl.
| | | |
|---|---|---|
| *E05C 7/04* | (2006.01) | |
| *B64D 29/08* | (2006.01) | |
| *E05B 63/14* | (2006.01) | |
| *E05C 19/14* | (2006.01) | |

(52) U.S. Cl.
CPC ............ *B64D 29/08* (2013.01); *E05B 63/143* (2013.01); *E05C 19/14* (2013.01)

(58) Field of Classification Search
CPC ........ B64D 29/08; B64D 29/06; B64D 27/12; B64D 27/26; B64D 29/00; B64D 2027/262; E05C 3/16; E05C 7/04; E05C 19/12; E05C 19/14; E05C 19/145; Y10S 292/49; E05B 63/06; Y10T 292/108; Y10T 292/216; F23R 3/60; F23R 3/00
USPC .................... 49/366, 367, 503, 501; 292/200
See application file for complete search history.

(56) References Cited

U.S. PATENT DOCUMENTS

| | | | | |
|---|---|---|---|---|
| 4,679,750 A | * | 7/1987 | Burhans ................. | B64D 29/06 244/129.4 |
| 5,350,136 A | * | 9/1994 | Prosser .................. | B64D 29/08 244/118.2 |
| 5,915,765 A | * | 6/1999 | Sternberger .......... | B64D 29/06 24/270 |
| 5,941,061 A | * | 8/1999 | Sherry ................... | B64D 29/08 244/54 |
| 6,629,712 B2 | | 10/2003 | Jackson et al. | |
| 6,666,408 B1 | * | 12/2003 | De Carvalho ......... | B64D 29/00 244/129.4 |
| 7,083,144 B2 | * | 8/2006 | Howe .................... | B64D 27/26 244/129.1 |
| 7,255,307 B2 | * | 8/2007 | Mayes ................... | B64D 29/06 244/129.5 |
| 7,275,362 B2 | | 10/2007 | Strunk et al. | |
| 9,353,559 B2 | | 5/2016 | Fabre et al. | |
| 9,366,202 B2 | | 6/2016 | Lacko | |
| 9,650,917 B2 | * | 5/2017 | Stewart ................. | F01D 25/24 |
| 9,822,734 B2 | * | 11/2017 | Chandler ............... | F02K 1/72 |

(Continued)

*Primary Examiner* — Chi Q Nguyen
(74) *Attorney, Agent, or Firm* — O'Shea Getz P.C.

(57) ABSTRACT

A nacelle for an aircraft propulsion system includes a first nacelle door, a second nacelle door and a plurality of latch assemblies. Each of the nacelle doors extends along and partially about a centerline. The latch assemblies are arranged along the centerline in an array, and configured to secure the nacelle doors together. A first of the latch assemblies includes a first latch mechanism and a first pin that pivotally mounts the first latch mechanism. A second of the latch assemblies includes a second latch mechanism and a second pin that pivotally mounts the second latch mechanism. An axis of the second pin is non-parallel with an axis of the first pin. The latch assemblies may be substantially identical to one another given the arrangement of the latch assemblies with the nacelle doors.

20 Claims, 9 Drawing Sheets

(56) References Cited

U.S. PATENT DOCUMENTS

| | | | |
|---|---|---|---|
| 2009/0173823 A1 | 7/2009 | Shetzer | |
| 2010/0284806 A1* | 11/2010 | Vauchel | B64D 29/06 415/214.1 |
| 2012/0102842 A1* | 5/2012 | Fournie | E05C 19/145 49/503 |
| 2013/0259641 A1* | 10/2013 | Stewart | B64D 29/08 415/1 |

\* cited by examiner

SET OF LATCHES WITH IDENTICAL COMPONENTS FOR NACELLE DOORS

BACKGROUND OF THE INVENTION

1. Technical Field

This disclosure relates generally to an aircraft propulsion system and, more particularly, to a latch system for doors of an aircraft propulsion system nacelle.

2. Background Information

Various types and configurations of latch systems are known in the art for securing doors of a nacelle together during aircraft operation. While these latch systems have various benefits, there is still room in the art for improvement. In particular, a set of latches in the past has comprised several customized latch assemblies, each aerodynamically shaped to fit into their particular location. The provision of several different latch assembles adds to the overall cost of the latch set.

SUMMARY OF THE DISCLOSURE

According to an aspect of the present disclosure, a nacelle is provided for an aircraft propulsion system. This nacelle includes a first nacelle door, a second nacelle door and a plurality of latch assemblies. Each of the nacelle doors extends along and partially about a centerline. The latch assemblies are arranged along the centerline in an array, and configured to secure the nacelle doors together. A first of the latch assemblies includes a first latch mechanism and a first pin that pivotally mounts the first latch mechanism. A second of the latch assemblies includes a second latch mechanism and a second pin that pivotally mounts the second latch mechanism. An axis of the second pin is non-parallel with an axis of the first pin.

According to another aspect of the present disclosure, another nacelle is provided for an aircraft propulsion system. This nacelle includes a first nacelle door, a second nacelle door and a plurality of latch assemblies. Each of the nacelle doors extends along and partially about a centerline. The latch assemblies are arranged along the centerline in an array, and configured to secure the nacelle doors together. A first of the latch assemblies includes a first latch mechanism and a first pin that pivotally mounts the first latch mechanism to the first cowl door. A second of the latch assemblies includes a second latch mechanism and a second pin that pivotally mounts the second latch mechanism to the first cowl door. An axis of the first pin is substantially parallel with an exterior surface of the first cowl door at a location of the first of the latch assemblies. An axis of the second pin is substantially parallel with the exterior surface of the first cowl door at a location of the second of the latch assemblies. The exterior surface changes (e.g., curves) between the location of the first of the latch assemblies and the location of the second of the latch assemblies.

According to still another aspect of the present disclosure, another nacelle is provided for an aircraft propulsion system. This nacelle includes a first nacelle door, a second nacelle door and a plurality of latch assemblies. Each of the nacelle doors extends along and partially about a centerline. The latch assemblies are distributed axially along the centerline, and configured to secure the cowl doors together. A first of the latch assemblies includes a first latch housing, a first pin and a first latch mechanism between first housing sidewalls of the first latch housing. The first pin is pivotally mounting the first latch mechanism to the first housing sidewalls. A second of the latch assemblies includes a second latch housing, a second pin and a second latch mechanism between second housing sidewalls of the second latch housing. The second pin is pivotally mounting the second latch mechanism to the second housing sidewalls. The first housing sidewalls are non-parallel with the second housing sidewalls.

The nacelle doors may be cowl doors, or any other doors configured with the nacelle.

The axis of the first pin may be substantially parallel with an exterior surface of the first nacelle door at a location of the first of the latch assemblies. The axis of the second pin may be substantially parallel with the exterior surface of the first nacelle door at a location of the second of the latch assemblies.

The exterior surface may curve between the location of the first of the latch assemblies and the location of the second of the latch assemblies.

The first of the latch assemblies may include a first latch housing with opposing first housing sidewalls. The first latch mechanism may be between the first housing sidewalls. The first pin may pivotally attach the first latch mechanism to the first housing sidewalls. The second of the latch assemblies may include a second latch housing with opposing second housing sidewalls. The second latch mechanism may be between the second housing sidewalls. The second pin may pivotally attach the second latch mechanism to the second housing sidewalls.

The first housing sidewalls may be substantially perpendicular to an exterior surface of the first nacelle door at a location of the first of the latch assemblies. The second housing sidewalls may be substantially perpendicular to the exterior surface of the first nacelle door at a location of the second of the latch assemblies.

The first housing may include a first housing base and the first housing sidewalls may project out from the first housing base. The second housing may include a second housing base and the second housing sidewalls may project out from the second housing base. The first housing sidewalls may be non-parallel with the second housing sidewalls.

The first latch housing may be substantially identical to the second latch housing.

The first latch mechanism may be substantially identical to the second latch mechanism.

The first pin may pivotally mount the first latch mechanism to the first nacelle door. The second pin may pivotally mount the second latch mechanism to the second nacelle door.

The nacelle may include a fan cowl that includes the first nacelle door and the second nacelle door.

The first of the latch assemblies may include a first latch keeper configured to mate with the first latch mechanism. The second of the latch assemblies may include a second latch keeper configured to mate with the second latch mechanism. An axis of the second latch keeper may be non-parallel with an axis of the first latch keeper.

The axis of the first pin may be non-parallel with the axis of the second pin.

The first of the latch assemblies may include a first latch housing with opposing first housing sidewalls. The first latch mechanism may be between the first housing sidewalls. The first pin may pivotally attach the first latch mechanism to the first housing sidewalls. The second of the latch assemblies may include a second latch housing with opposing second housing sidewalls. The second latch mechanism may be between the second housing sidewalls. The second pin may pivotally attach the second latch mechanism to the second housing sidewalls.

The first housing sidewalls may be substantially perpendicular to an exterior surface of the first cowl door at a location of the first of the latch assemblies. The second housing sidewalls may be substantially perpendicular to the exterior surface of the first cowl door at a location of the second of the latch assemblies.

The first housing may include a first housing base and the first housing sidewalls may project out from the first housing base. The second housing may include a second housing base and the second housing sidewalls may project out from the second housing base. The first housing sidewalls may be non-parallel with the second housing sidewalls.

An axis of the first pin may be substantially parallel with an exterior surface of the first cowl door at a location of the first of the latch assemblies. An axis of the second pin may be substantially parallel with the exterior surface of the first cowl door at a location of the second of the latch assemblies.

The first housing sidewalls may be substantially perpendicular to an exterior surface of the first cowl door at a location of the first of the latch assemblies. The second housing sidewalls may be substantially perpendicular to the exterior surface of the first cowl door at a location of the second of the latch assemblies.

An axis of the second pin may be non-parallel with an axis of the first pin.

The foregoing features and the operation of the invention will become more apparent in light of the following description and the accompanying drawings.

DETAILED DESCRIPTION OF THE INVENTION

Figure 1:
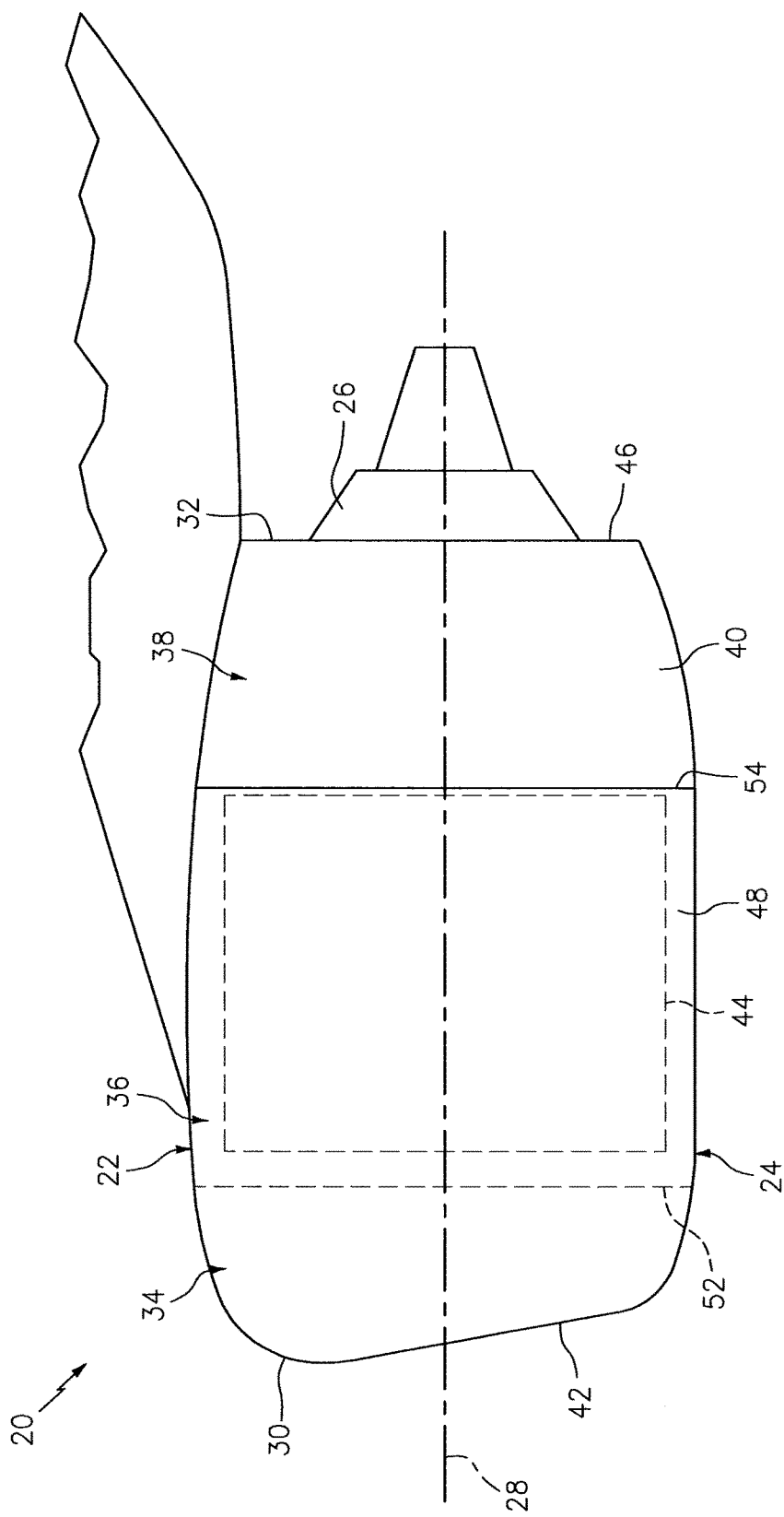
FIG. 1 is a side schematic illustration of an aircraft propulsion system.

FIG. 1 illustrates an aircraft propulsion system 20 for an aircraft such as a commercial airliner. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 includes a nacelle outer structure 24 and a nacelle inner structure 26; e.g., an inner fixed structure or IFS. The outer structure 24 is configured to house and provide an aerodynamic cover for a fan section of the gas turbine engine. The outer structure 24 is also configured to form a bypass flowpath with the inner structure 26. Briefly, a portion of air propelled aft by the fan section ("bypass air") is routed through the bypass flowpath and out of the propulsion system 20. This bypass air thereby bypasses a core of the gas turbine engine, which is housed within the inner structure 26. The bypass air may provide a majority (e.g., more than 75%) of engine thrust in the case of a high-bypass turbofan engine.

The outer structure 24 extends along an axial centerline 28 between an outer structure forward end 30 and an outer structure aft end 32. The outer structure 24 may include an inlet structure 34 (e.g., module or cowl), a fan cowl 36 and an aft structure 38, which may include one or more translating sleeves 40 for a thrust reverser (one such sleeve 40 visible in FIG. 1). The inlet structure 34 is disposed at the outer structure forward end 30. The inlet structure 34 is configured to direct a stream of air through an inlet opening 42 at the outer structure forward end 30 and into a fan section of the gas turbine engine.

The fan cowl 36 is disposed axially between the inlet structure 34 and the aft structure 38. The fan cowl 36 of FIG. 1, in particular, is disposed at an aft end of a stationary portion of the outer structure 24, and extends forward to the inlet structure 34. This fan cowl 36 is generally axially aligned with the fan section of the gas turbine engine. The fan cowl 36 is configured to provide an aerodynamic covering for a fan case 44, which circumscribes the fan section and partially forms an outer peripheral boundary of the bypass flowpath. It should be noted, the term "stationary portion" is used above to describe a portion of the outer structure 24 which is stationary during propulsion system 20 operation (e.g., during takeoff, aircraft flight and landing). However, the stationary portion may be otherwise movable for propulsion system 20 inspection/maintenance as described below; e.g., when the propulsion system 20 is non-operational.

The aft structure 38 is disposed at the outer structure aft end 32. The aft structure 38 is configure to further partially form the outer peripheral boundary of the bypass flowpath, which extends through the propulsion system 20 to a nozzle 46. The aft structure 38 forms the nozzle 46 with the inner structure 26.

Figure 2:
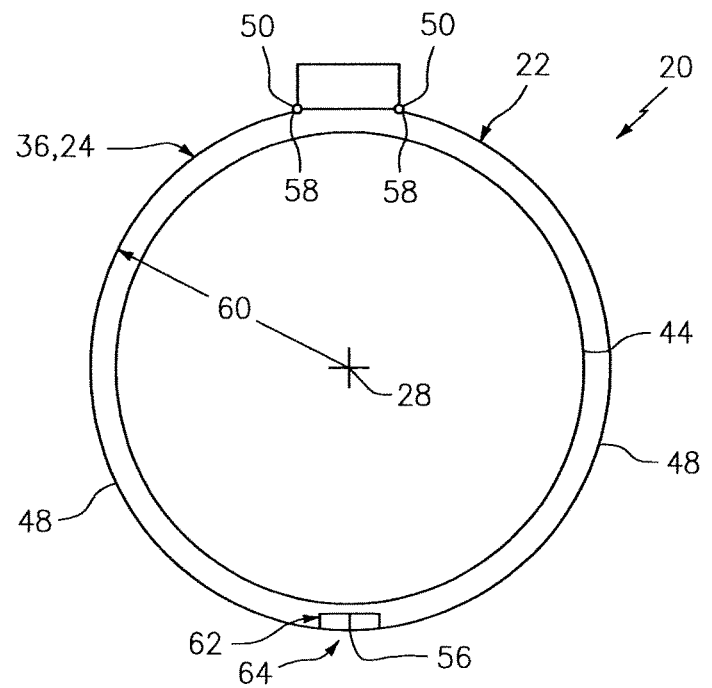
FIG. 2 is a cross-sectional schematic illustration of the aircraft propulsion system with its nacelle doors in closed positions.
Figure 3:
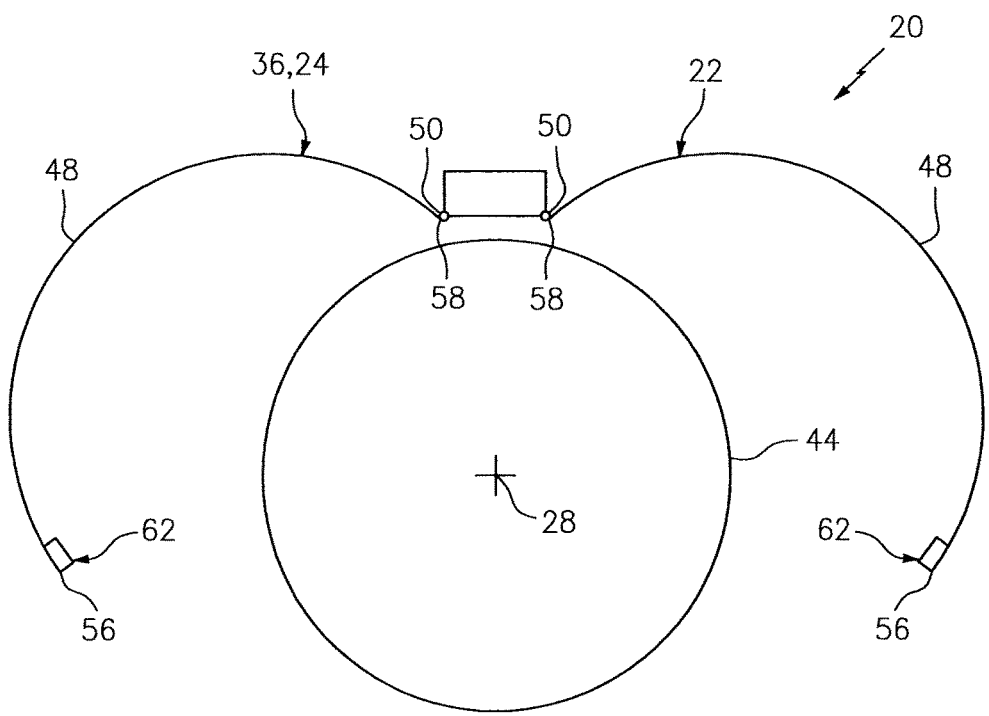
FIG. 3 is a cross-sectional schematic illustration of the aircraft propulsion system with its nacelle doors in open positions.

Referring to FIGS. 2 and 3, to provide access to the components of the gas turbine engine such as the fan case 44 and/or peripheral equipment configured therewith for inspection, maintenance and/or otherwise, the fan cowl 36 includes a plurality of cowl doors 48. Each of these cowl doors 48 is movably (e.g., pivotally) mounted with the aircraft propulsion system 20 by, for example, a pivoting hinge system 50. In this manner, each of the cowl doors 48 may be pivoted about a pivot axis between a closed position (see FIG. 2) and an open position (see FIG. 3), which pivot axis may be substantially parallel with the axial centerline 28.

Each of the cowl doors 48 has a parti-tubular/arcuate body. More particularly, referring to FIG. 1, each of the cowl doors 48 extends axially along the centerline 28 between a forward circumferential edge 52 and an aft circumferential edge 54. Referring again to FIGS. 2 and 3, each of the cowl doors 48 extends generally circumferentially about the centerline 28 between a top latch edge 56 and a bottom pivot edge 58, where the respective cowl door 48 is pivotally mounted at (e.g., on, adjacent or proximate) the pivot end 58. It is worth noting, each of the cowl doors 48 has a radius 60 measured from the axis 28 to the external surface of the cowl door 48 (see FIG. 2) which may vary at different locations of the cowl door 48. Each of the cowl doors 48 thereby may have a complex three dimensional curvature.

Figure 4:
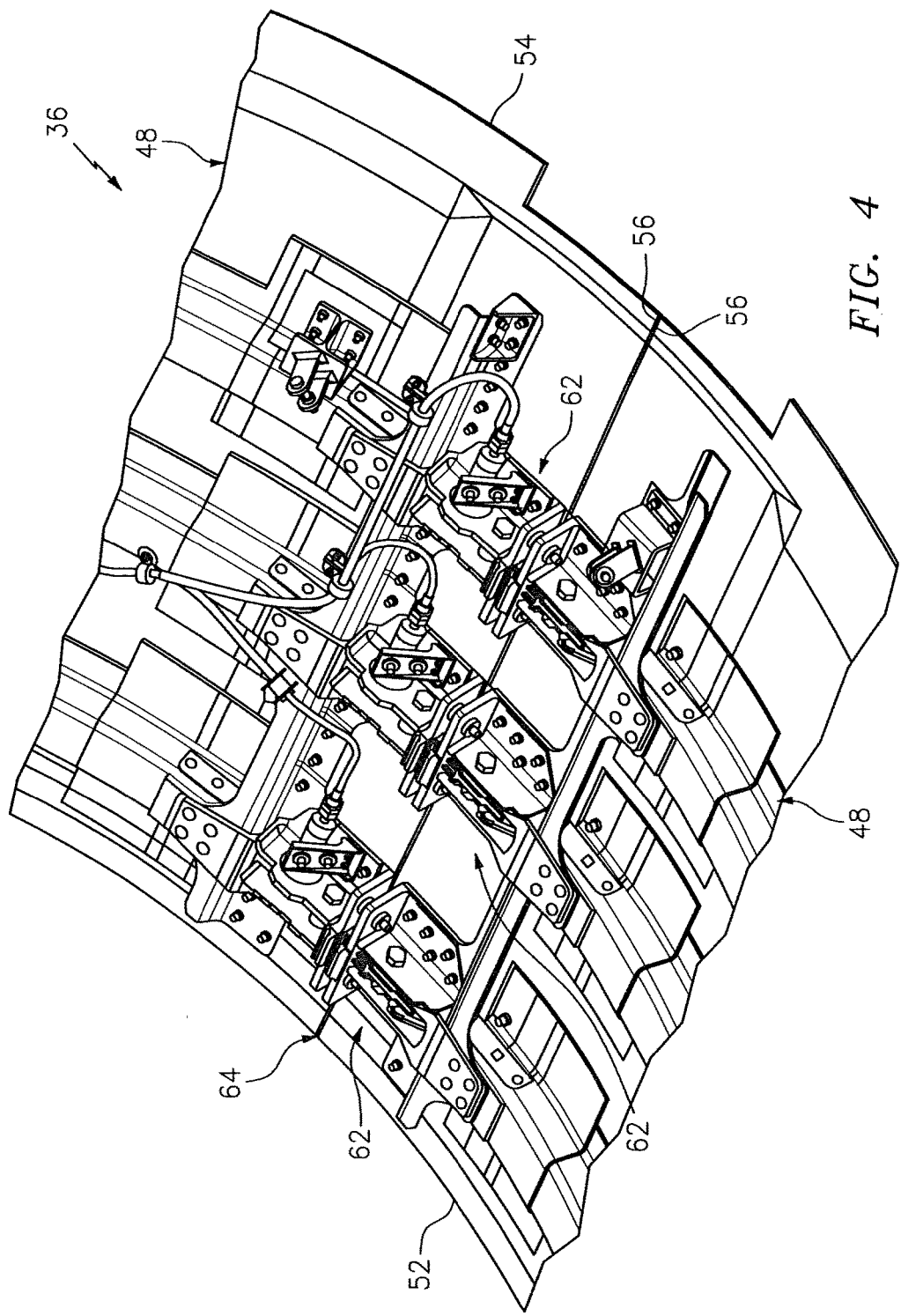
FIG. 4 is a perspective illustration of an interior portion of the nacelle doors and a latch system.

Referring to FIGS. 2 and 4, the nacelle 22 also includes a latch system or latch set, which includes a plurality of latch assemblies 62. These latch assemblies 62 are configured with the fan cowl 36 to secure the cowl doors 48 to one another when those doors 48 are in their closed positions. When the doors 48 are closed, the latch assemblies 62 are arranged along the bottom latch edge 56 (and different axial locations along the centerline 28) in an array (e.g., a generally axially extending curvilinear array) attached to and extending between each of the cowl doors 48. Briefly, this interface 64 represents an interface (e.g., a butt joint) between the cowl doors 48 at their latch ends 56 when the cowl doors 48 are closed.

Figure 5:
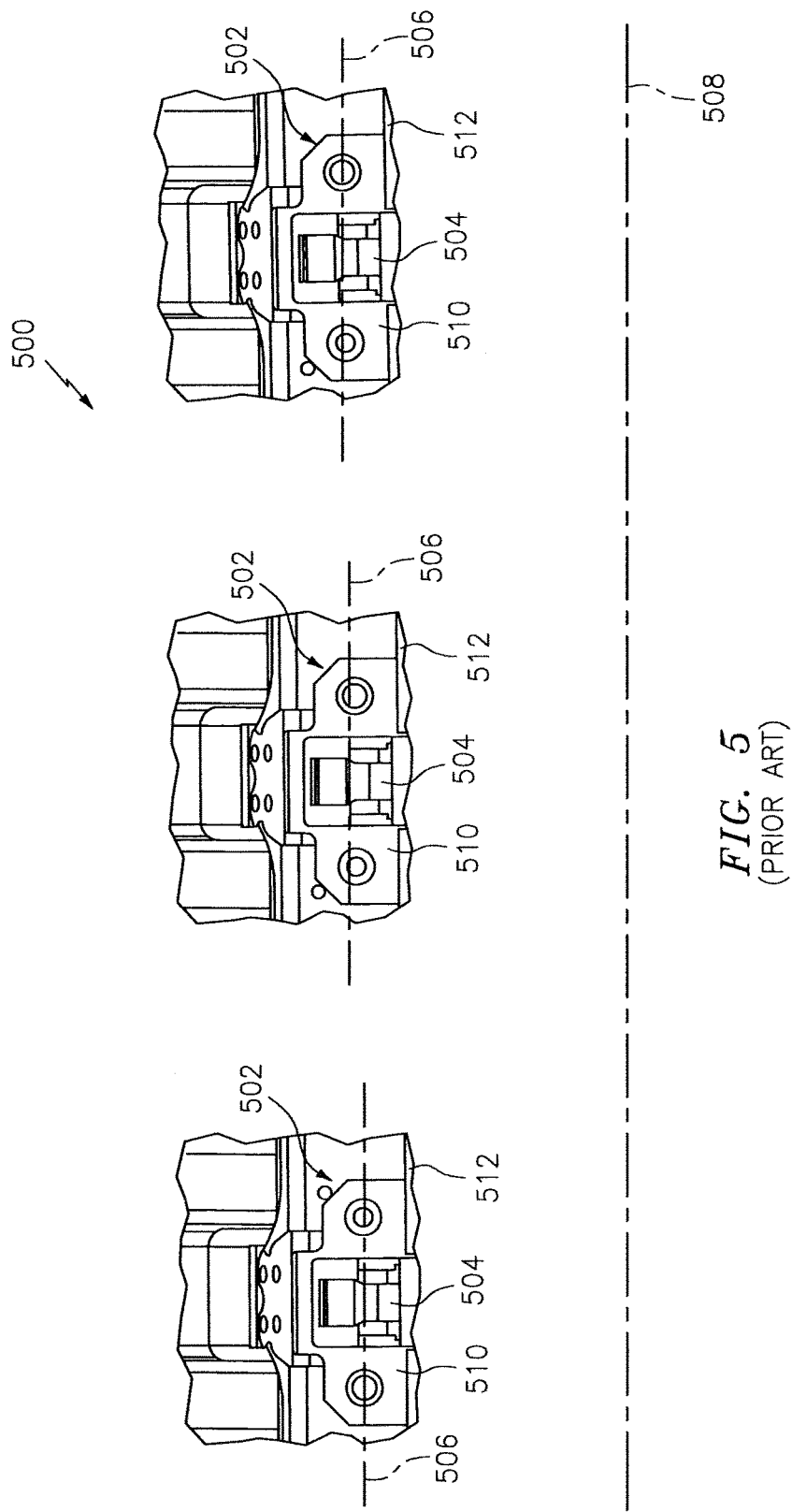
FIG. 5 is a perspective illustration of a cowl door with a prior art latch system.

FIG. 5 illustrates a prior art nacelle 500 with multiple latch assemblies 502 having different components and configurations. Each of these prior art latch assemblies 502 includes a latch mechanism 504 configured to pivot about a pivot axis 506 that is parallel with an engine centerline 508, such that the plane of motion of each latch mechanism is normal to the centerline axis 508. To facilitate this latch mechanism 504 configuration, each latch assembly 502 includes a distinctly configured latch housing 510 as well as a distinctly configured latch mechanism 504 such that those components are able to follow a contour of the external surface of cowl doors 512. Requiring different—location dependent—latch assembly 502 configurations may increase nacelle manufacturing costs as well as assembly time and complexity.

In contrast to FIG. 5, the set of latch assemblies 62 of the present disclosure as shown in FIG. 4 may be manufactured to be substantially identical to one another. The latch assemblies 62, for example, may have substantially the same components, component configurations, component sizes, component geometries, operability and/or kinematics. This enables the design and manufacture of a single latch assembly 62 for use at multiple different locations on the nacelle 22; e.g., at different axial locations along the interface 64.

Figure 6:
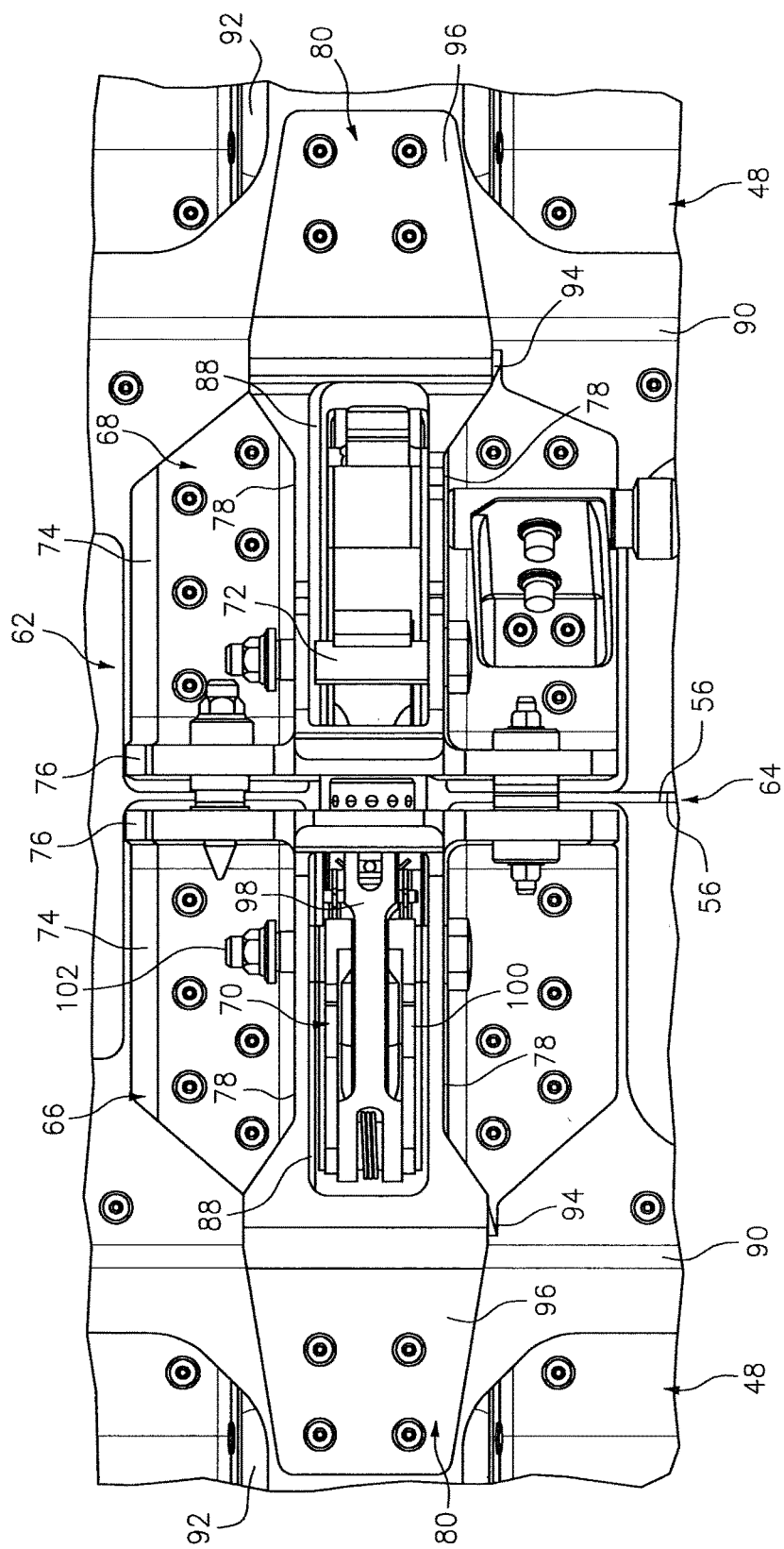
FIG. 6 is a perspective illustration of a latch assembly configured with the nacelle doors.
Figure 7:
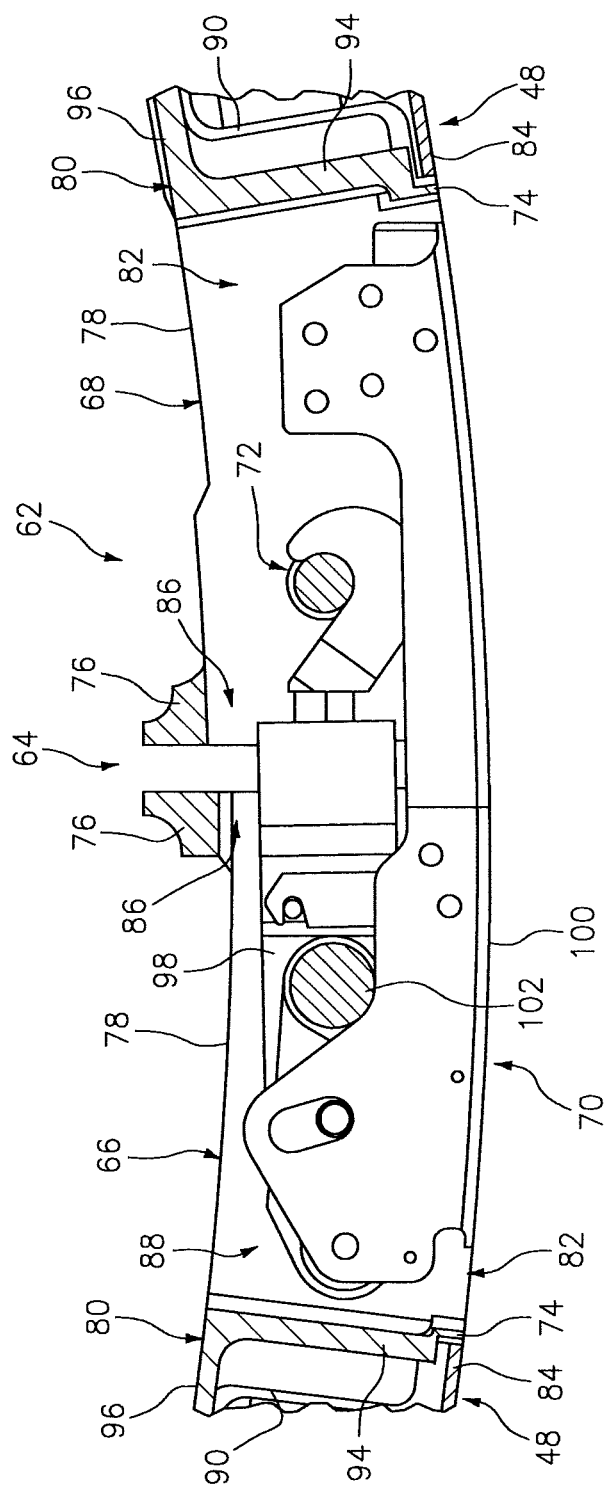
FIG. 7 is a side sectional illustration of the latch assembly and nacelle doors of FIG. 6.

Referring to FIGS. 6 and 7, each of the latch assemblies 62 includes a latch housing 66, a keeper housing 68, a latch mechanism 70 and a keeper 72. Each of the housings 66 and 68 includes a housing base 74, a housing interface endwall 76, opposing housing sidewalls 78 and a mounting endwall structure 80, which housing components 74, 76, 78 and/or 80 may be cast, machined, additively manufacture and/or otherwise formed together as a unitary, monolithic body.

The housing base 74 may be configured as a baseplate. This housing base 74 is configured to lay radially against and, thus, generally follow the contour of the respective cowl door 48. The housing base 74 includes an aperture 82, which is aligned with a corresponding aperture in the cowl door 48. The housing base 74 is attached to the respective cowl door 48 with one or more fasteners; e.g., bolts, screws, rivets. Of course, in other embodiments, the housing base 74 may also or alternatively be attached to the respective cowl door 48 using other attachment techniques; e.g., welding, brazing, adhering and/or otherwise bonding.

The housing interface endwall 76 is located next to, but may be slightly recessed from, the latch end 56 of the respective cowl door 48. The housing interface endwall 76 projects depthwise (e.g., generally radially inward) out from the housing base 74 to a distal housing interface endwall end. The housing interface endwall 76 may be substantially perpendicular to the respective cowl door 48. For example, the housing interface endwall 76 of FIGS. 6 and 7 is configured substantially perpendicular to a portion of an exterior surface 84 (see FIG. 7) of the respective cowl door 48 at a location of the respective latch assembly 62 and, more particularly, at a location of that endwall 76. The housing interface endwall 76 of FIGS. 6 and 7 includes an aperture 86, through which the latch mechanism 70 may extend when mated with the keeper 72. This aperture 86 is aligned with the aperture 82 in the housing base 74; see also FIG. 8.

Each of the housing sidewalls 78 extends longitudinally between the housing interface endwall 76 and the mounting endwall structure 80. Each of the housing sidewalls 78 projects depthwise (e.g., generally radially inward) out from the housing base 74 to a distal housing sidewall end. The housing sidewalls 78 are arranged on opposing sides of the apertures 82 and 86, thereby forming a channel 88 within the respective housing 66, 68 (see also FIG. 8) that receives a portion of the latch mechanism 70 (and the keeper 72 in the case of the keeper housing 68).

Figure 8:
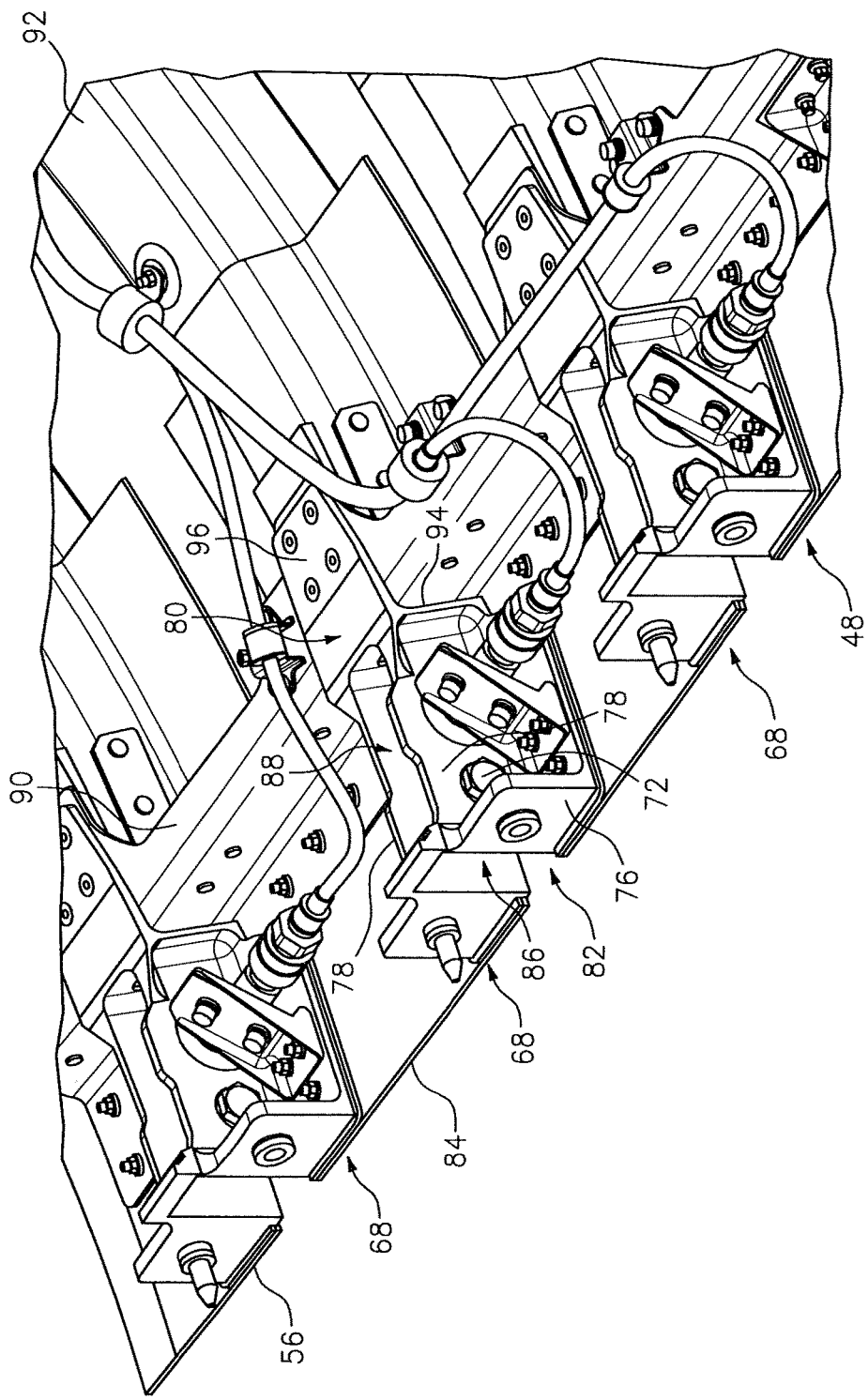
FIG. 8 is a perspective illustration of the latch assembly and one of the nacelle doors of FIG. 4.

Each of the housing sidewalls 78 may be substantially perpendicular to the respective cowl door 48. Each of the housing sidewalls 78 of FIG. 8 is configured substantially perpendicular to a portion of the exterior surface 84 of the respective cowl door 48 at a location of the respective latch assembly 62 and, more particularly, at a location of that sidewall 78. In contrast, the sidewalls of the housing 510 in each latch assembly 502 of FIG. 5 are angled (non-parallel) with respect to an exterior surface of the cowl door 512, and basically normal to the engine centerline 508. This angle is a result of the location specific configuration of the latch assemblies 502 of FIG. 5.

Referring again to FIGS. 6 and 7, the mounting endwall structure 80 is configured to abut against (or may be next to) an axially extending support 90 (e.g., a longeron) of the respective cowl door 48. The mounting endwall structure 80 is further configured to mount the respective housing 66, 68 to a circumferentially extending support 92 (e.g., hollow hat) of the respective cowl door 48. The mounting endwall structure 80 of FIGS. 6 and 7, for example, includes a housing endwall 94 and a mounting flange 96. The housing endwall 94 extends laterally between the housing sidewalls 78, and extends depthwise (e.g., generally radially inward) out from the housing base 74 to the mounting flange 96. The mounting flange 96 projects longitudinally out from the housing endwall 94 to a distal end. With this configuration, the housing endwall 94 abuts against the support and the mounting flange 96 overlaps the supports 90 and 92. The mounting flange 96 is also attached to one or more of the supports 90 and/or 92 and, thus, the respective cowl door 48 with one or more fasteners; e.g., bolts, screws, rivets. Of course, in other embodiments, the mounting flange 96 may also or alternatively be attached to the respective support(s) using other attachment techniques; e.g., welding, brazing, adhering and/or otherwise bonding.

The latch mechanism 70 is configured to selectively engage with and disengage from the keeper 72. When engaged, the mated latch mechanism 70 and keeper 72 are operable to secure the cowl doors 48 together with tension; e.g., maintain the cowl doors 48 in their closed positions.

The latch mechanism 70 of FIGS. 6 and 7 is disposed within the channels 88 of the latch housing 66 and the keeper housing 68. The latch mechanism 70 may include a latch 98 and a handle 100. The latch 98 is pivotally mounted to the housing sidewalls 78 of the latch housing 66 by a latch pin 102. The latch 98 is configured to engage and hold the keeper 72 (e.g., a keeper pin) when in a latched position, where the keeper 72 extends across the channel 88 of the keeper housing 68 and is secured to the housing sidewalls 78 of the keeper housing 68. The handle 100 is pivotally attached to the latch 98. With this configuration, the handle 100 may be pivoted (in a radial outward direction) out from the channel 88 and the cowl doors 48. This handle 100 movement may cause the latch 98 to disengage from the keeper 72 and pivot (in a radial outward direction) about the latch pin 102. Of course, various other latch mechanism and keeper configurations are known in the art, which may be retrofitted according to the teachings of the present disclosure.

Figure 9:
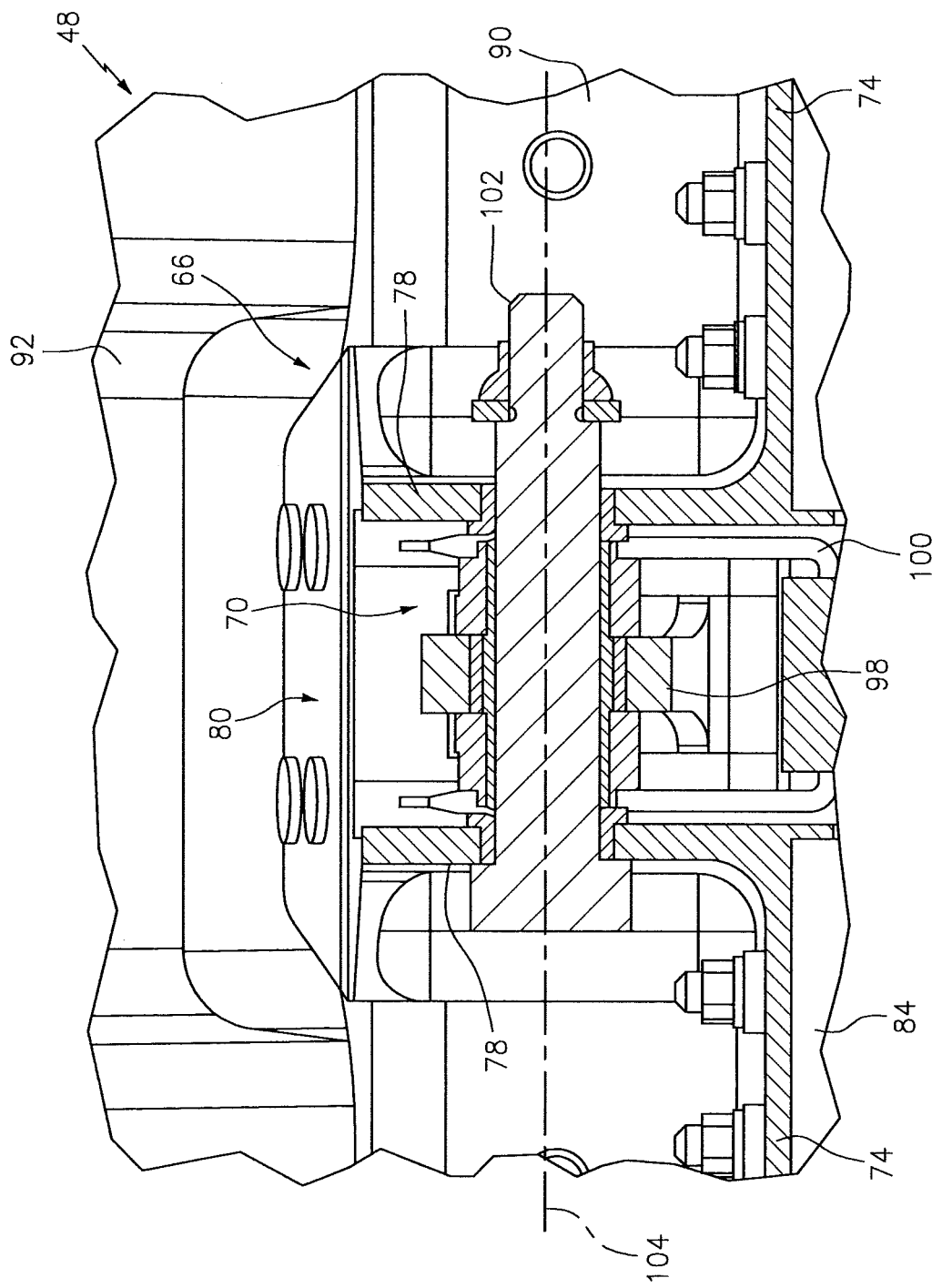
FIG. 9 is a perspective cross-sectional illustration of the latch assembly and one of the nacelle doors of FIG. 6.
Figure 10:
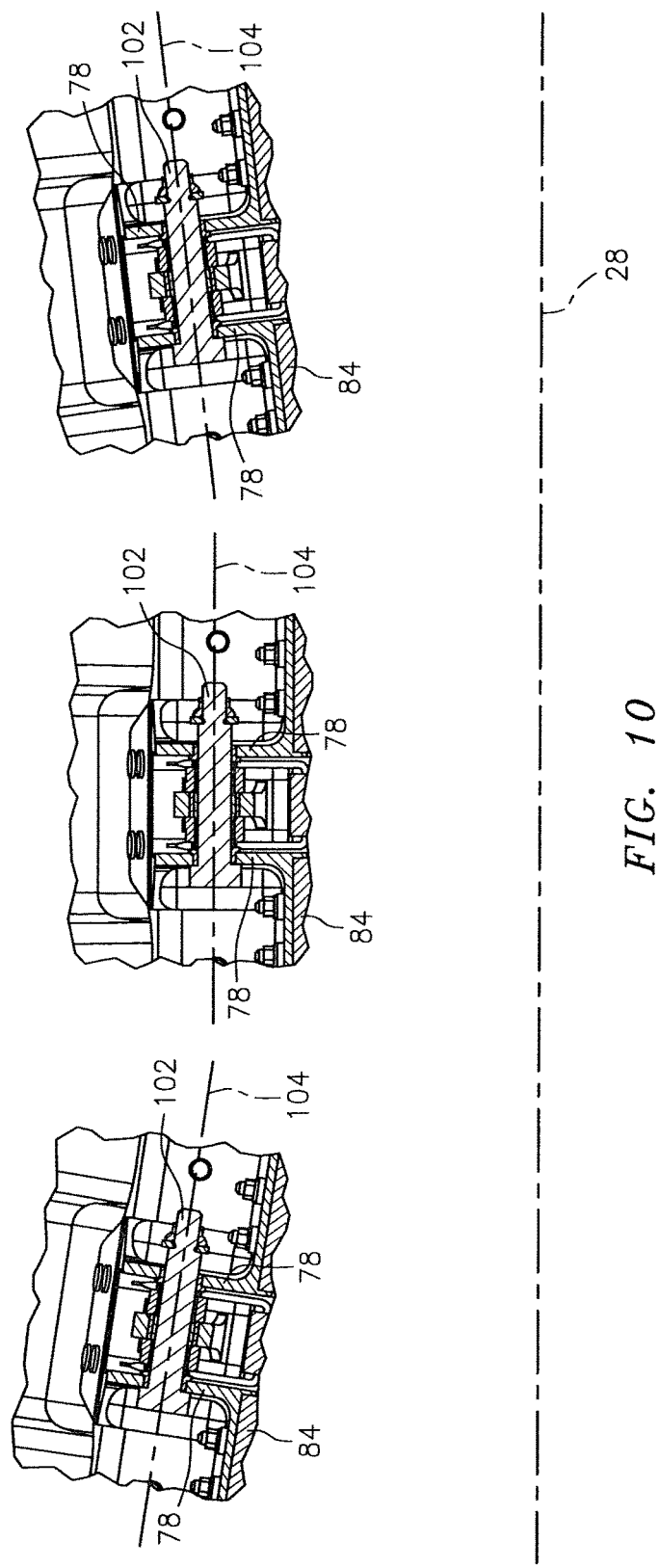
FIG. 10 is a segmented, side-sectional perspective illustration of the latch assemblies and one of the nacelle doors of FIG. 4.

As best seen in FIG. 9, the latch pin 102 may be substantially parallel to the respective cowl door 48 external surface. An axis 104 of the latch pin 102 of FIG. 9, for example, is configured substantially parallel to a portion of the exterior surface 84 of the respective cowl door 48 at a location of the respective latch assembly 62 and, more particularly, at a location of that latch pin 102. The keeper 72 may also have a similar parallel configuration. With such a configuration along with the curved surface of the cowl doors 48, the axes 104 of the latch assembly latch pins 102 are non-parallel with one another and/or the centerline 28 as shown in FIG. 10. Similarly, the housing sidewalls 78 are (e.g., depthwise) non-parallel with one another. It is worth noting, the axial curvature of the fan cowl 36 can sometimes be subtle; therefore, the curvature shown in FIG. 10 is exaggerated to better show the non-parallel relationship between the latch pins 102. In contrast, the pivot axes 506 of the pins in the latch assemblies 502 of FIG. 5 are parallel with one another as a result of the location specific configurations of those latch assemblies 502.

In some embodiments, the aft structure 38 may include a plurality of doors. Each of these doors may include a respective one of the translating sleeves 40. In such embodiments, these aft structure 38 doors may also be configured with latch assemblies 62 as described above with respect to the cowl doors.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A nacelle for an aircraft propulsion system, comprising:
   first and second nacelle doors, each extending along and circumferentially about a centerline; and
   a plurality of latch assemblies arranged along the centerline in an array, and configured to secure the nacelle doors together;
   a first of the latch assemblies comprising a first latch mechanism and a first pin that pivotally mounts the first latch mechanism, and a second of the latch assemblies comprising a second latch mechanism and a second pin that pivotally mounts the second latch mechanism, wherein an axis of the second pin is non-parallel with an axis of the first pin.

2. The nacelle of claim 1, wherein
   the axis of the first pin is substantially parallel with an exterior surface of the first nacelle door at a location of the first of the latch assemblies; and
   the axis of the second pin is substantially parallel with the exterior surface of the first nacelle door at a location of the second of the latch assemblies.

3. The nacelle of claim 2, wherein the exterior surface curves between the location of the first of the latch assemblies and the location of the second of the latch assemblies.

4. The nacelle of claim 1, wherein
   the first of the latch assemblies further comprises a first latch housing with opposing first housing sidewalls, the first latch mechanism is between the first housing sidewalls, and the first pin pivotally attaches the first latch mechanism to the first housing sidewalls; and
   the second of the latch assemblies further comprises a second latch housing with opposing second housing sidewalls, the second latch mechanism is between the second housing sidewalls, and the second pin pivotally attaches the second latch mechanism to the second housing sidewalls.

5. The nacelle of claim 4, wherein
   the first housing sidewalls are substantially perpendicular to an exterior surface of the first nacelle door at a location of the first of the latch assemblies; and
   the second housing sidewalls are substantially perpendicular to the exterior surface of the first nacelle door at a location of the second of the latch assemblies.

6. The nacelle of claim 4, wherein
   the first housing further includes a first housing base and the first housing sidewalls project out from the first housing base;
   the second housing further includes a second housing base and the second housing sidewalls project out from the second housing base; and
   the first housing sidewalls are non-parallel with the second housing sidewalls.

7. The nacelle of claim 4, wherein the first latch housing is substantially identical to the second latch housing.

8. The nacelle of claim 1, wherein the first latch mechanism is substantially identical to the second latch mechanism.

9. The nacelle of claim 1, wherein the first pin pivotally mounts the first latch mechanism to the first nacelle door, and the second pin pivotally mounts the second latch mechanism to the second nacelle door.

10. The nacelle of claim 1, further comprising a fan cowl that includes the first nacelle door and the second nacelle door.

11. The nacelle of claim 1, wherein the first of the latch assemblies further includes a first latch keeper configured to mate with the first latch mechanism, the second of the latch assemblies further includes a second latch keeper configured to mate with the second latch mechanism, and an axis of the second latch keeper is non-parallel with an axis of the first latch keeper.

12. A nacelle for an aircraft propulsion system, comprising:
   first and second cowl doors, each extending along and circumferentially about a centerline; and
   a plurality of latch assemblies arranged along the centerline in an array such that a first of the latch assemblies is axially displaced from a second of the latch assemblies along the centerline, and the latch assemblies configured to secure the cowl doors together;
   the first of the latch assemblies comprising a first latch mechanism and a first pin that pivotally mounts the first latch mechanism to the first cowl door, and the second of the latch assemblies comprising a second latch mechanism and a second pin that pivotally mounts the second latch mechanism to the first cowl door; and an axis of the first pin is substantially parallel with an exterior surface of the first cowl door at a location of the first of the latch assemblies, and an axis of the second pin is substantially parallel with the exterior surface of the first cowl door at a location of the second of the latch assemblies, wherein the exterior surface curves between the location of the first of the latch assemblies and the location of the second of the latch assemblies.

13. The nacelle of claim 12, wherein the axis of the first pin is non-parallel with the axis of the second pin.

14. The nacelle of claim 12, wherein the first of the latch assemblies further comprises a first latch housing with opposing first housing sidewalls, the first latch mechanism is between the first housing sidewalls, and the first pin pivotally attaches the first latch mechanism to the first housing sidewalls; and the second of the latch assemblies further comprises a second latch housing with opposing second housing sidewalls, the second latch mechanism is between the second housing sidewalls, and the second pin pivotally attaches the second latch mechanism to the second housing sidewalls.

15. The nacelle of claim 14, wherein the first housing sidewalls are substantially perpendicular to an exterior surface of the first cowl door at a location of the first of the latch assemblies; and the second housing sidewalls are substantially perpendicular to the exterior surface of the first cowl door at a location of the second of the latch assemblies.

16. The nacelle of claim 14, wherein the first housing further includes a first housing base and the first housing sidewalls project out from the first housing base;

the second housing further includes a second housing base and the second housing sidewalls project out from the second housing base; and the first housing sidewalls are non-parallel with the second housing sidewalls.

17. A nacelle for an aircraft propulsion system, comprising:

first and second cowl doors, each extending along and circumferentially about a centerline; and a plurality of latch assemblies distributed axially along the centerline, and configured to secure the cowl doors together;

a first of the latch assemblies comprising a first latch housing, a first pin and a first latch mechanism between first housing sidewalls of the first latch housing, and the first pin pivotally mounting the first latch mechanism to the first housing sidewalls; and a second of the latch assemblies comprising a second latch housing, a second pin and a second latch mechanism between second housing sidewalls of the second latch housing, and the second pin pivotally mounting the second latch mechanism to the second housing sidewalls;

wherein the first housing sidewalls are non-parallel with the second housing sidewalls.

18. The nacelle of claim 17, wherein an axis of the first pin is substantially parallel with an exterior surface of the first cowl door at a location of the first of the latch assemblies, and an axis of the second pin is substantially parallel with the exterior surface of the first cowl door at a location of the second of the latch assemblies.

19. The nacelle of claim 17, wherein the first housing sidewalls are substantially perpendicular to an exterior surface of the first cowl door at a location of the first of the latch assemblies; and the second housing sidewalls are substantially perpendicular to the exterior surface of the first cowl door at a location of the second of the latch assemblies.

20. The nacelle of claim 17, wherein an axis of the second pin is non-parallel with an axis of the first pin.

* * * * *